United States Patent
Tsai

(10) Patent No.: US 7,773,262 B2
(45) Date of Patent: Aug. 10, 2010

(54) IMAGE RENDERING METHOD

(75) Inventor: Yao-Chung Tsai, Taoyuan Hsien (TW)

(73) Assignee: TECO Image Systems Co. Ltd, Taoyuan Hsien (TW)

( * ) Notice: Subject to any disclaimer, the term of this patent is extended or adjusted under 35 U.S.C. 154(b) by 524 days.

(21) Appl. No.: 11/940,209

(22) Filed: Nov. 14, 2007

(65) Prior Publication Data

US 2008/0309954 A1 Dec. 18, 2008

(30) Foreign Application Priority Data

Jun. 12, 2007 (TW) .............................. 96121222 A

(51) Int. Cl.
*G06K 15/02* (2006.01)
*G06F 13/28* (2006.01)
*G06F 13/00* (2006.01)

(52) U.S. Cl. ........................... 358/1.9; 358/1.1; 382/173

(58) Field of Classification Search ................... 358/1.1, 358/1.9, 3.01, 3.06, 534, 536, 448; 382/173, 382/175, 180
See application file for complete search history.

(56) References Cited

U.S. PATENT DOCUMENTS

| | | | | | |
|---|---|---|---|---|---|
| 5,339,172 | A | * | 8/1994 | Robinson | 358/462 |
| 5,341,226 | A | * | 8/1994 | Shiau | 358/518 |
| 5,758,042 | A | * | 5/1998 | Deschuytere | 358/1.15 |
| 5,767,978 | A | * | 6/1998 | Revankar et al. | 358/296 |
| 5,949,964 | A | * | 9/1999 | Clouthier et al. | 358/3.06 |
| 6,665,094 | B1 | * | 12/2003 | Lapstun | 358/1.9 |

* cited by examiner

*Primary Examiner*—Thomas D Lee
(74) *Attorney, Agent, or Firm*—Kirton & McConkie; Evan R. Witt

(57) ABSTRACT

An image rendering method includes the following steps. Firstly, a source image is provided. Then, raster operations (ROPs) are performed on the source image by a first bit operating engine to obtain ROP values, and the source image are divided into at least one first region and at least one second region. Then, a first operation is performed on the first region by the first bit operating engine and a render process is executed, thereby generating first bit image data. Then, a second operation is performed on the second region by a second bit operating engine and a render process is executed, thereby generating second bit image data. Afterwards, the second bit image data of the second region are converted into first bit image data of the second region according to a screening table between the first bit operating engine and the second bit operating engine.

13 Claims, 5 Drawing Sheets

IMAGE RENDERING METHOD

FIELD OF THE INVENTION

The present invention relates to an image rendering method, and more particularly to an image rendering method for use with a printer so as to enhance image rendering efficiency and accuracy.

BACKGROUND OF THE INVENTION

Image rendering devices such as printers, scanners or copiers are widely used as output devices of computers. Take a color printer for example. For printing images by the color printer, a print command is issued from the host of the computer to the color printer. When the print command is received, the color printer may analyze and interpret the print command to generate a bitmap image. That is, when the print command is received by the raster image processor inside the color printer, the source image and text data are encoded in a specific page description language (PDL), for example a PostScript language provided by an Adobe System or a page control language (PCL) provided by Hewlett-Packard Company. As a consequence, the bitmap image is generated and stored in the raster memory of the color printer. The process of converting the analyzed data into the bitmap image is referred as a rendering method. By the rendering method, the CMYK color image or the RGB image received by the graphic device interface (GDI) of the host of the computer is converted into the bitmap image. After the whole page is rendered in the raster memory, the printer is ready for transmitting the rasterized dot stream to the printing paper.

During the image rendering process, the page description language (PCL) such as the page control language usually defines several raster operations (ROPs). In the PCL based systems, a total of 256 ROPs are defined. The ROPs specify the manner in which the source image, the paint and the destination image need to be combined to obtain the final bitmap image. The print controller of the color printer usually has a rendering engine to implement the image rendering process. In other words, the rendering engine may perform ROPs on the source image, the paint and the destination image. By the rendering engine, the essential display-list elements of the source image are combined as the bitmap image, thereby generating the paints for filling the source image. In addition, the rendering engine may perform ROPs on the source image and paint the destination image, thereby generating the bitmap image representing the page content.

Generally, the source image conforms to the CMYK or RGB standard. For example, in a case that the RGB image is 24-bit image, each channel has 8 bits. In views of the image rendering accuracy, an 8-bit operating engine is employed to perform ROPs on the whole source image, thereby generating accurate 8-bit image data. Next, the 8-bit image data are converted into 1-bit image data with different grayscale of brightness intensities according to a screening table. As known, this image rendering process needs very complicated computation and thus the rendering speed and efficiency are usually unsatisfied.

In another image rendering process, the source image is firstly converted into 1-bit image data and then the 1-bit ROP is done. Although the rendering speed and efficiency are enhanced, the image rendering accuracy is reduced.

Therefore, there is a need of providing an improved image rendering method for obviating the drawbacks encountered by the prior art.

SUMMARY OF THE INVENTION

It is an object of the present invention to provide image rendering method with enhanced rendering speed, efficiency and accuracy.

In accordance with an aspect of the present invention, there is provided an image rendering method. The image rendering method includes steps of (a) providing a source image; (b) performing raster operations (ROPs) on the source image by a first bit operating engine to obtain ROP values and dividing the source image into at least one first region and at least one second region; (c) performing a first operation on the first region by the first bit operating engine and executing a render process, thereby generating first bit image data; (d) performing a second operation on the second region by a second bit operating engine and executing a render process, thereby generating second bit image data; and (e) converting the second bit image data of the second region into first bit image data of the second region according to a screening table between the first bit operating engine and the second bit operating engine.

In an embodiment, the source image is encoded in a specific page description language.

In an embodiment, the operating speed of the first bit operating engine is relatively faster than that of the second bit operating engine.

In an embodiment, the first region represents a region obtaining an accurate rendering result after the first operation of the first bit operating engine. The second region represents a region obtaining an inaccurate rendering result after the first operation of the first bit operating engine.

In an embodiment, the image rendering method further includes steps of (a1) dividing the source image into several bands; (b1) labeling specified marks one by one on the second region, and merging the marks which are overlapped with each other; (c1) converting the first bit image data of the first region into CMYK-based image data; and (d1) converting the second bit image data of the second region into CMYK-based image data.

In an embodiment, the first bit operating engine is a 1-bit operating engine and the second bit operating engine is an 8-bit operating engine.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The image rendering method of the present invention may be applied to an image rendering device such as color printer in order to enhance the rendering efficiency and the rendering accuracy. As previously described, if the whole source image is processed by a single operating engine, either the rendering efficiency or the rendering accuracy is reduced. In accordance with a specific feature of the present invention, the source image is divided into at least two different regions. These regions are processed by different bits of operating engines. In this description, a 1-bit operating engine and an 8-bit operating engine are employed for illustration. As a result, the image rendering method of the present invention has enhanced rendering efficiency as well as increased rendering accuracy.

Figure 1:
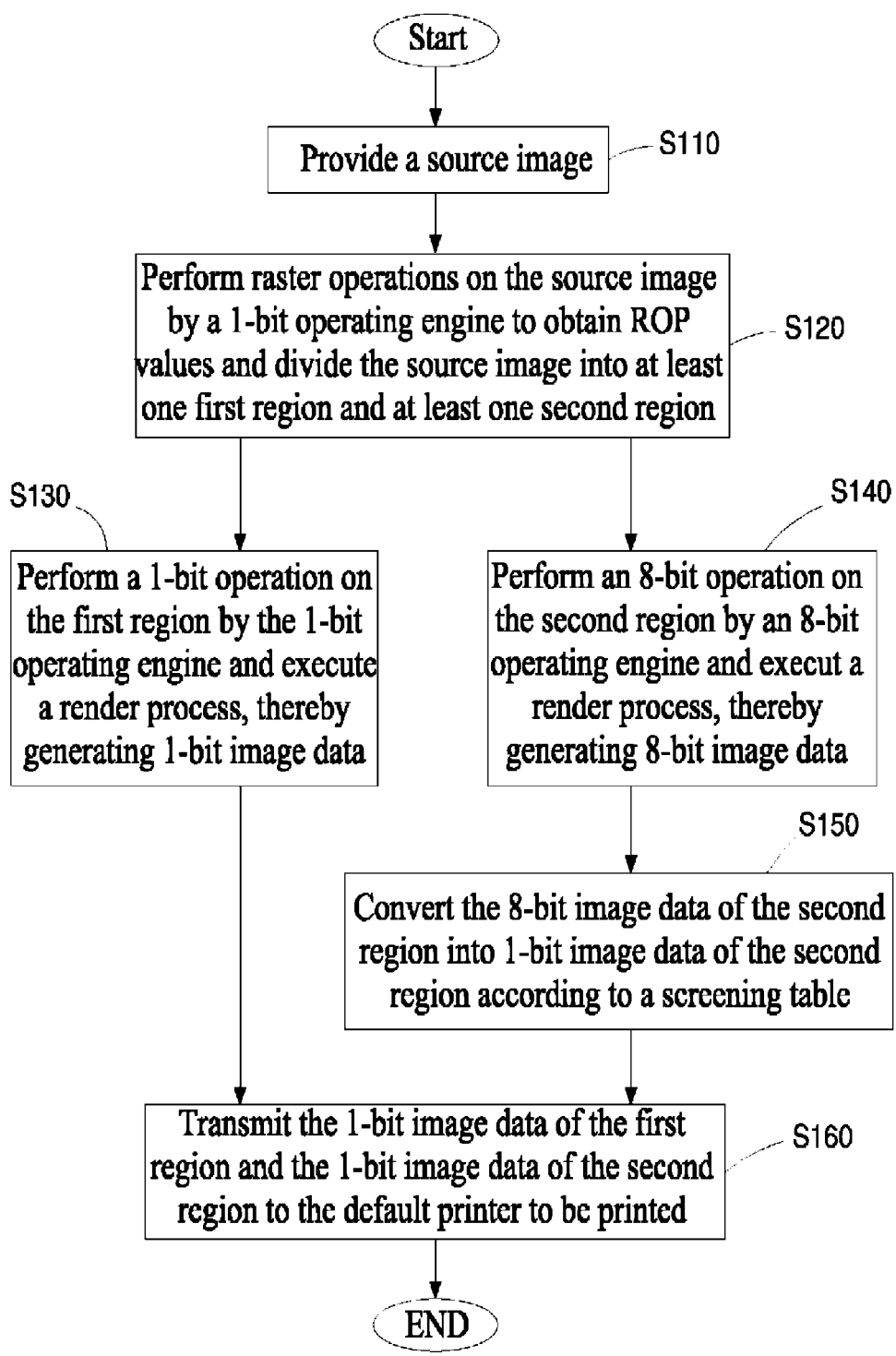
FIG. 1 is a flowchart illustrating an image rendering method according to a first preferred embodiment of the present invention.

Hereinafter, an image rendering method according to a first preferred embodiment of the present invention will be illustrated with reference to the flowchart of FIG. 1. First of all, a source image to be printed is provided (Step S110). Next, a 1-bit operating engine is employed to perform raster operations (ROPs) on the source image, thereby generating ROP values. According to the ROP values, the source image is divided into at least one first region and at least one second region (Step S120). The first region represents a region capable of obtaining an accurate rendering result after the operation of the 1-bit operating engine. Whereas, the second region represents another region obtaining an inaccurate rendering result for print after the operation of the 1-bit operating engine. The detailed principles of the first region and the second region will be illustrated later. Next, a 1-bit operation is performed on the first region by the 1-bit operating engine and then a render process is done, thereby generating 1-bit image data of the first region (Step S130). Meanwhile, an 8-bit operation is performed on the second region by an 8-bit operating engine and then a render process is done, thereby generating 8-bit image data of the second region (Step S140). Next, according to a screening table, the 8-bit image data of the second region are converted into 1-bit image data of the second region (Step S150). Afterwards, the 1-bit image data of the first region and the 1-bit image data of the second region are transmitted to the default printer to be printed (Step S160).

As previously described, if the whole source image is processed by the 1-bit operating engine, the image rendering accuracy is reduced. In addition, if the whole source image is processed by the 8-bit operating engine, the rendering speed and efficiency are also reduced. According to the present invention, since the first region and the second region are respectively processed by the 1-bit operating engine and the 8-bit operating engine, the image rendering accuracy, the rendering speed and the rendering efficiency are satisfied.

Figure 2:
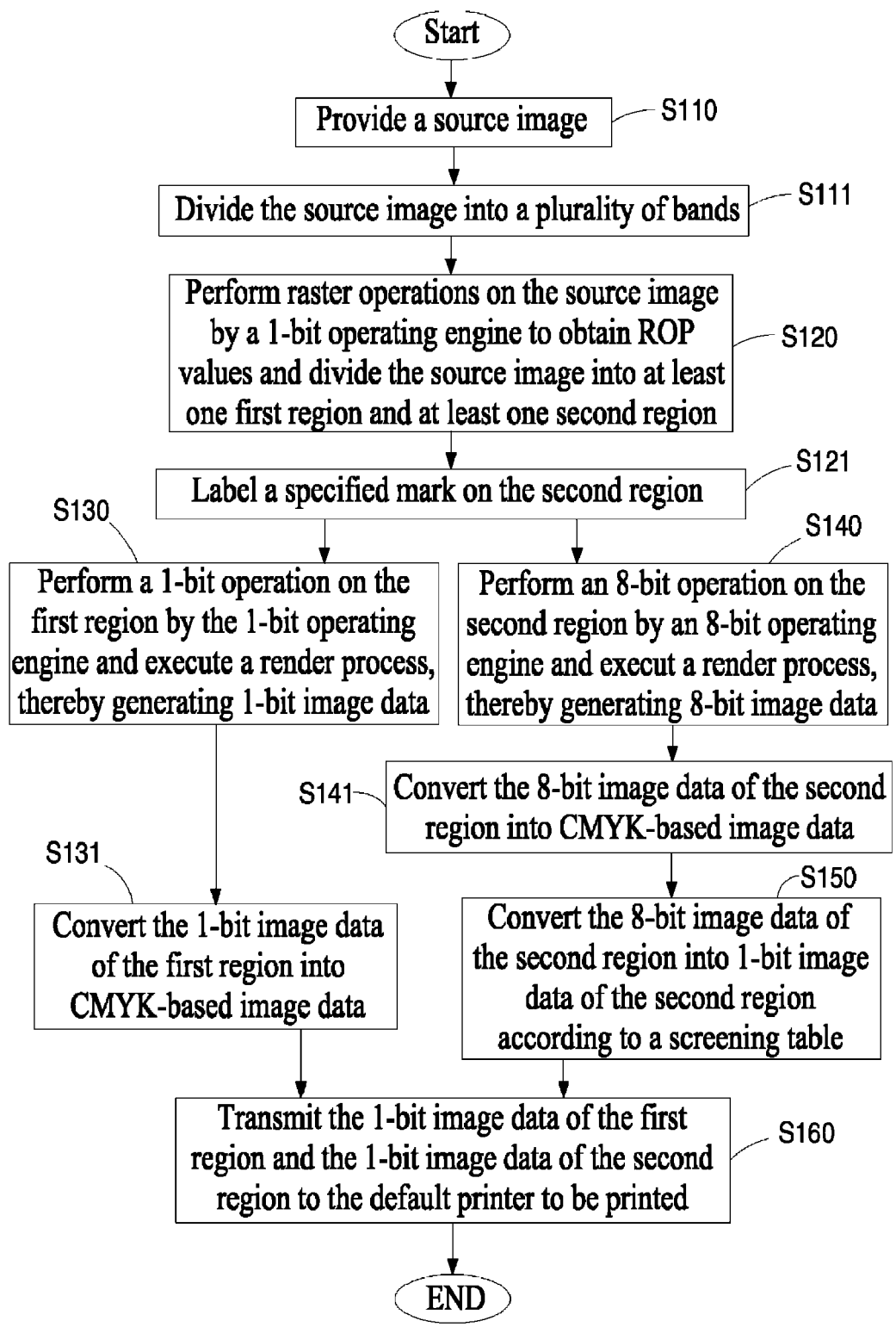
FIG. 2 is a flowchart illustrating an image rendering method according to a second preferred embodiment of the present invention.

Referring to FIG. 2, an image rendering method according to a second preferred embodiment of the present invention is illustrated. First of all, a source image to be printed is provided (Step S110). Next, the source image is divided into a plurality of bands (Step S111). Next, a 1-bit operating engine is employed to perform raster operations (ROPs) on the source image, thereby generating ROP values. According to the ROP values, the source image is divided into at least one first region and at least one second region (Step S120). After a specified mark is labeled on the second region (Step S121), a 1-bit operation is performed on the first region by the 1-bit operating engine and then a render process is done, thereby generating 1-bit image data of the first region (Step S130). The 1-bit image data of the first region are then converted into CMYK-based image data (Step S131). Successively, an 8-bit operation is performed on the second region by an 8-bit operating engine and then a render process is done, thereby generating 8-bit image data of the second region (Step S140). The 8-bit image data of the second region are then converted into CMYK-based image data (Step S141). It is of course that the 8-bit image data of the second region may be converted into RGB image data or other standard color image data. Next, according to a screening table, the 8-bit image data of the second region are converted into 1-bit image data of the second region (Step S150). Afterwards, the 1-bit image data of the first region and the 1-bit image data of the second region are transmitted to the default printer to be printed (Step S160). In this embodiment, the source image is divided into a plurality of bands and the ROP values are obtained in respective bands, so that the comparing speed is increased. Moreover, the location of the second region may be labeled by the specified marks one by one. As a result, different regions may be quickly processed by respective operating engines of different bits. Since the image data are converted into CMYK-based image data for printer, the data transmission speed between the printer and the host is increased.

Figure 3:
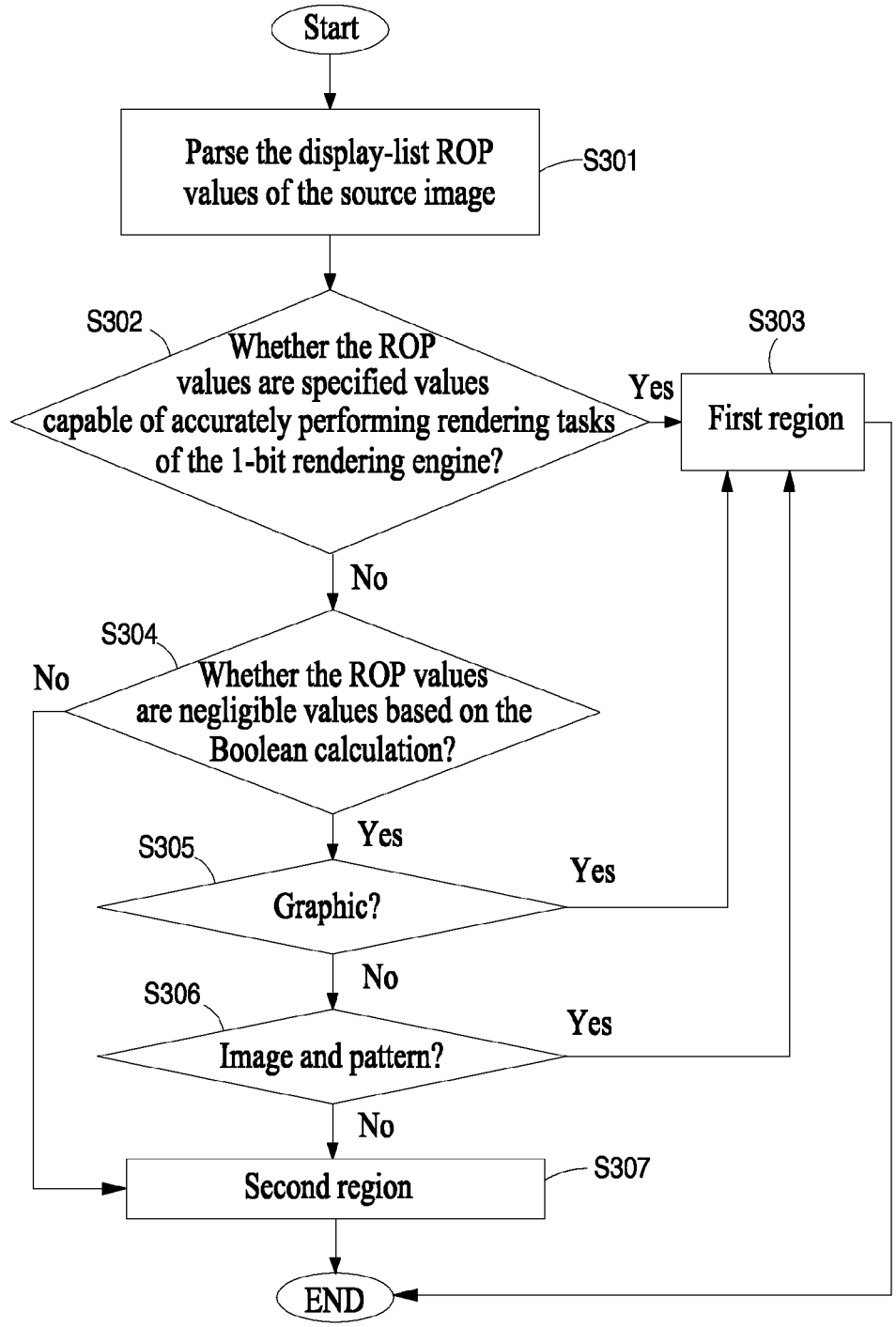
FIG. 3 is a flowchart illustrating a process of discriminating the first region and the second region.

Hereinafter, a process of discriminating the first region and the second region will be illustrated with reference to the flowchart of FIG. 3. First of all, the parser of the printer controller parses the display-list ROP values of the source image (Step S301). Next, it is discriminated whether the ROP values are specified values capable of accurately performing rendering tasks of the 1-bit rendering engine (Step S302). The specified values are for example 0, 240 or 255. In a case that the ROP values conform to the specified values, the region where the 1-bit rendering task can be done is discriminated as the first region (Step S303). Whereas, in another case that the ROP values fail to accurately perform rendering tasks of the 1-bit rendering engine, it is further discriminated whether the ROP values are negligible values based on the Boolean calculation (Step S304). For example, in the page control language (PCL) system provided by Hewlett-Packard Company, the ROP value=252 indicates that the OP code based on the Boolean calculation is zero. That is, the specified values may be neglected. In an embodiment, the region where the ROP value is not negligible value is discriminated as the second region (Step S307). Whereas, if the ROP value is a negligible value based on the Boolean calculation (e.g. ROP value=252), it is further discriminated whether the region is a graphic object (Step S305). The graphic region is discriminated as the first region. If the region is not a graphic object, it is further discriminated whether the region is an image and pattern (Step S306). The region of the image and pattern is discriminated as the first region. If the region is not an image and pattern object, the region is discriminated as the second region (Step S307). In accordance with the method of FIG. 3, the source image is divided into the first region and the second region.

Figure 4A:
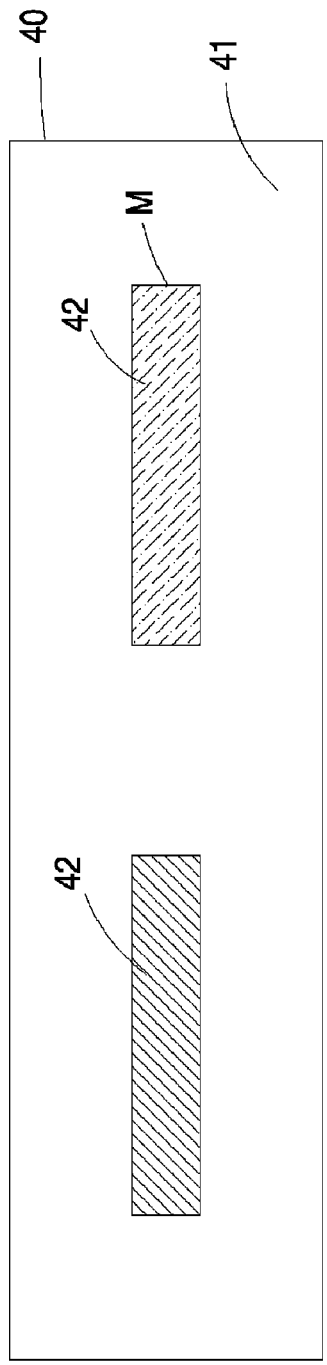
FIGS. 4(A) and 4(B) are schematic views illustrating a method of labeling the specified mark according to a first preferred embodiment of the present invention.
Figure 4B:
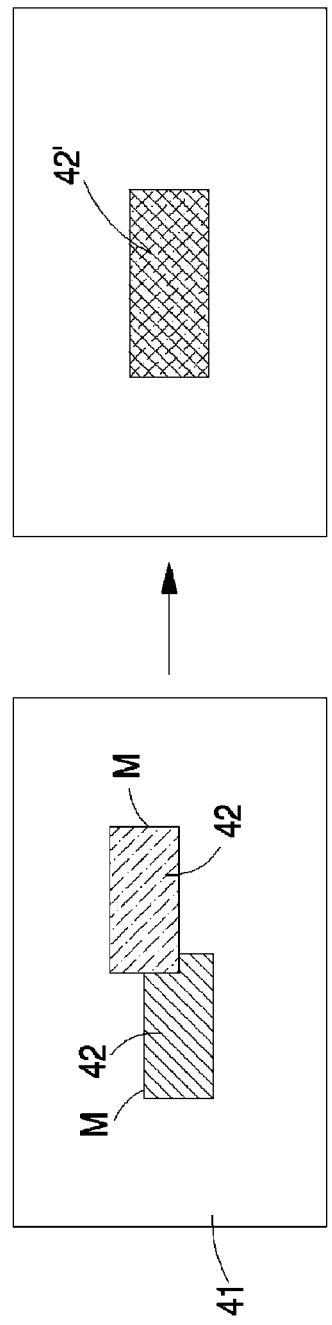

For more quickly recognizing the location of the second region, the second region may be labeled by a specified mark. Referring to FIGS. 4(A) and 4(B), a method of labeling the specified mark according to a first preferred embodiment of the present invention is illustrated. As shown in FIG. 4(A), the source image is divided into a plurality of bands 40 (Step S111 as shown in FIG. 2). If the first region 41 is distinguished from the second region 42, the second region 42 is labeled by the rectangular mark M. Of course, the mark M may have an arbitrary shape, for example a circular shape or a triangular shape. The size of the mark M is adjusted as required. As shown in FIG. 4(B), if at least two rectangular marks M are overlapped with each other, the second regions labeled by the rectangular marks M may be merged into a relatively larger second region 42'. In such manner, the total number of the second regions is reduced and thus the operational speed of the rendering task is enhanced.

Figure 5:
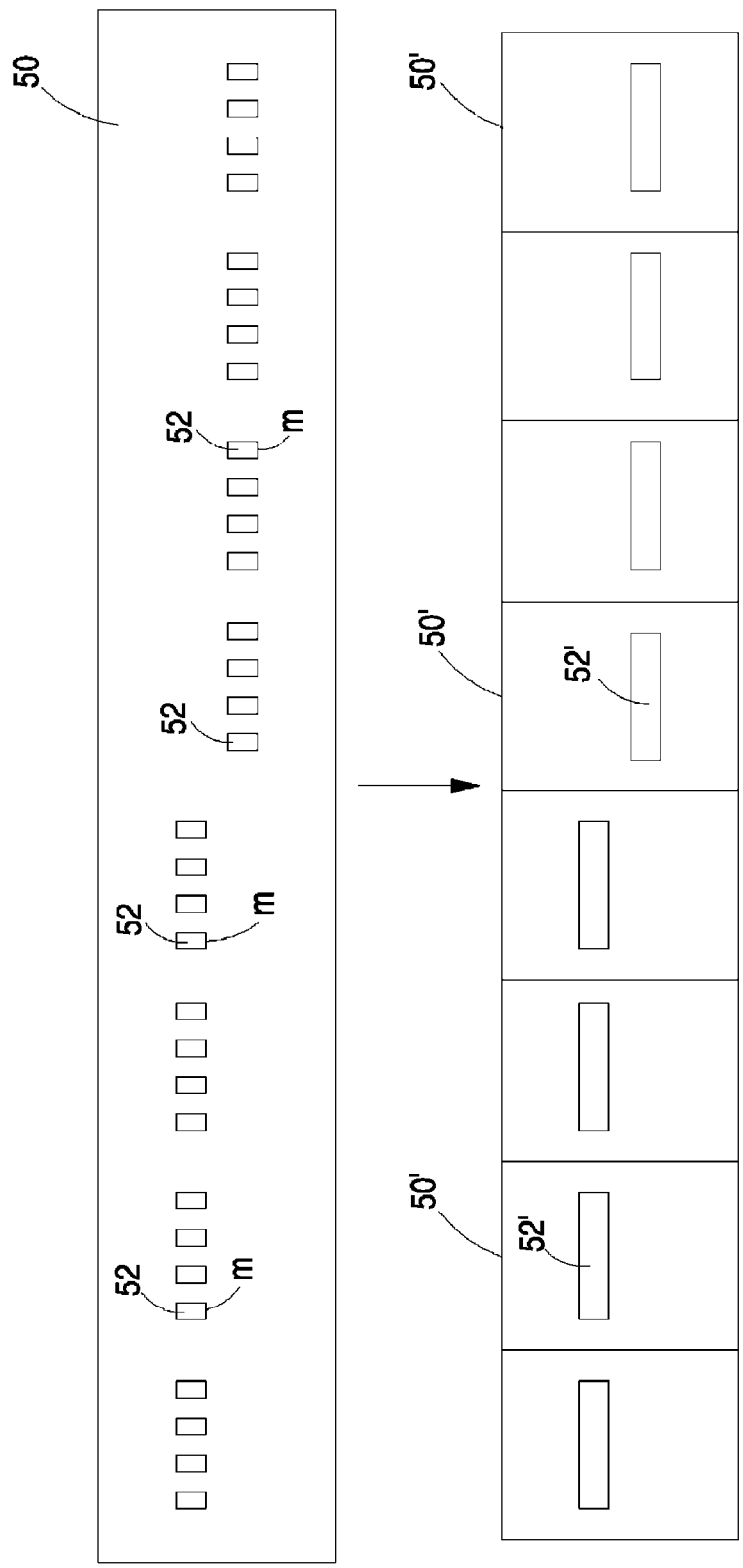
FIG. 5 is schematic view illustrating a method of labeling the specified mark according to a second preferred embodiment of the present invention.

Referring to FIG. 5, a method of labeling the specified mark according to a second preferred embodiment of the present invention is illustrated. As shown in FIG. 5, there are many separate specified marks m. If the total number of the separate specified marks m exceeds a threshold (e.g. 30) in a band 50, the band 50 may be divided into several blocks 50' of the same size. For example, the band 50 is divided into 8 blocks 50'. In addition, every 4 separate specified marks m are merged into an integral second region 52' regardless of whether any two second regions are overlapped with each other. As a consequence, during the rendering task of the 8-bit operating engine is done, the second region 42 or 52 labeled by the specified mark M or m are used to determine whether the rendering task should be done. Alternatively, according to the present invention, the band having two kinds of marks may be used to record the halftone setting and the neutralaxis setting, which may be used as reference parameters of converting the ROP values into 1-bit data when the 8-bit rendering task is performed.

In the above embodiments, 1-bit and 8-bit operating engines are employed to carry out the image rendering method of the present invention. Nevertheless, other operating engines of different bits are also applicable. In addition, the application range of the screening table may be varied according to the practical requirement.

From the above description, the image rendering method of the present invention has enhanced rendering efficiency and increased rendering accuracy when compared with the prior art. According to the present invention, the source image is divided into at least two different regions, which are respectively processed by respective operating engines of different bits. As a consequence, the problem of having high speed but low accuracy or having high accuracy but low speed will be solved. Moreover, since the source image may be divided into several bands or blocks, the first region and the second region will be quickly recognized and the rendering speed and efficiency will be enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image rendering method, comprising steps of:
    (a) providing a source image;
    (b) performing raster operations (ROPs) on said source image by a first bit operating engine to obtain ROP values and dividing said source image into at least one first region and at least one second region;
    (c) performing a first operation on said first region by said first bit operating engine and executing a render process, thereby generating first bit image data;
    (d) performing a second operation on said second region by a second bit operating engine and executing a render process, thereby generating second bit image data; and
    (e) converting said second bit image data of said second region into first bit image data of said second region according to a screening table between said first bit operating engine and said second bit operating engine.

2. The image rendering method according to claim 1 wherein said source image is encoded in a specific page description language.

3. The image rendering method according to claim 1 wherein the operating speed of said first bit operating engine is relatively faster than that of said second bit operating engine.

4. The image rendering method according to claim 1 wherein said first region represents a region obtaining an accurate rendering result after said first operation of said first bit operating engine.

5. The image rendering method according to claim 1 wherein said second region represents a region obtaining an inaccurate rendering result after said first operation of said first bit operating engine.

6. The image rendering method according to claim 1 wherein said step (a) further includes a step (a1) of dividing said source image into several bands.

7. The image rendering method according to claim 1 wherein said step (b) further includes a step (b1) of labeling specified marks one by one on said second region, and merging said marks which are overlapped with each other.

8. The image rendering method according to claim 7 wherein said specified marks are rectangular marks.

9. The image rendering method according to claim 1 wherein said step (c) further includes a step (c1) of converting said first bit image data of said first region into CMYK-based image data.

10. The image rendering method according to claim 1 wherein said step (d) further includes a step (d1) of converting said second bit image data of said second region into CMYK-based image data.

11. The image rendering method according to claim 1 further including a step of transmitting said first bit image data of said first region and said first bit image data of said second region to a printer to be printed.

12. The image rendering method according to claim 1 wherein said first bit operating engine is a 1-bit operating engine.

13. The image rendering method according to claim 1 wherein said second bit operating engine is an 8-bit operating engine.

* * * * *